UNITED STATES PATENT OFFICE.

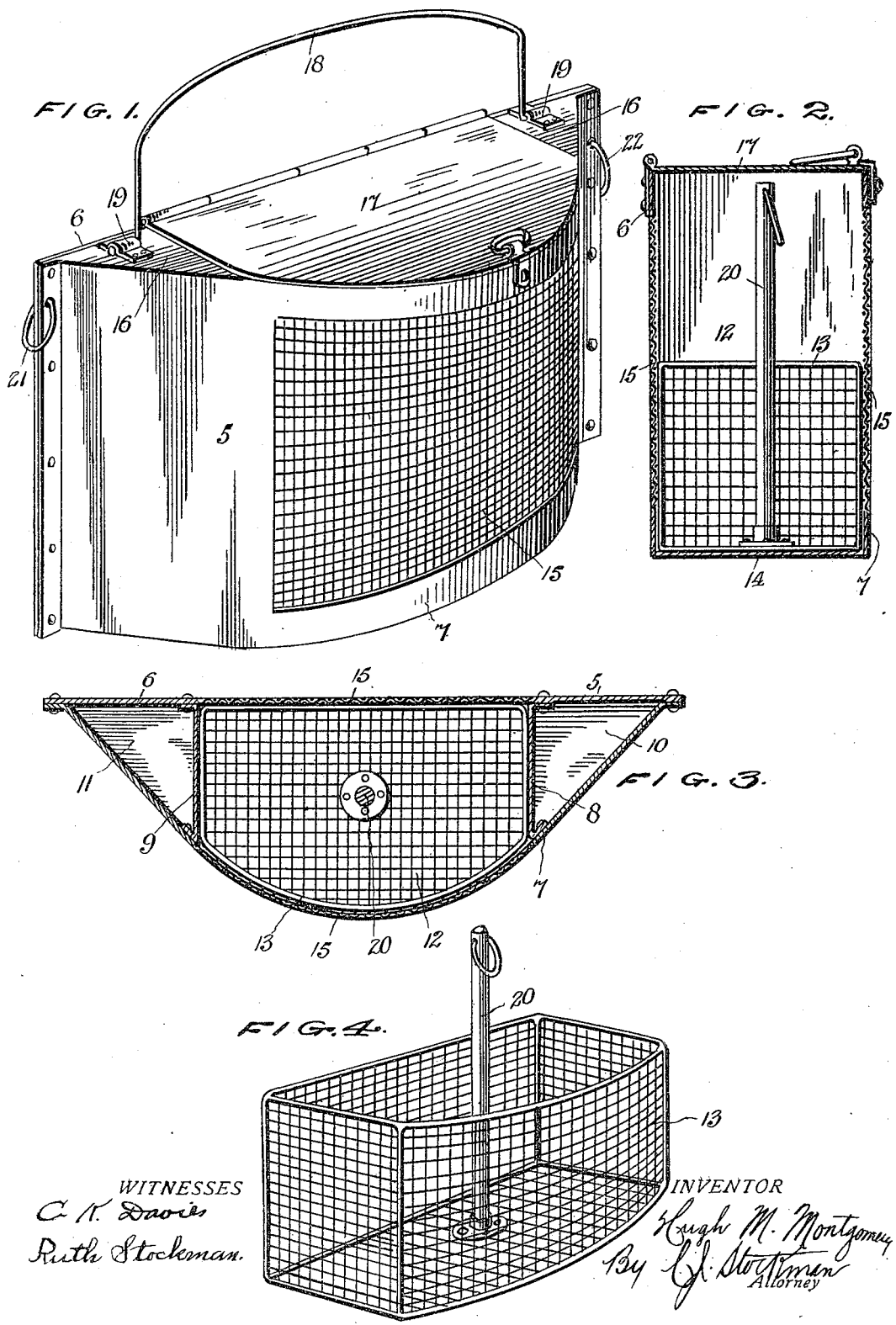

HUGH M. MONTGOMERY, OF INDIANOLA, MISSISSIPPI.

RECEPTACLE FOR LIVE BAIT.

953,540.  Specification of Letters Patent.  Patented Mar. 29, 1910.

Application filed May 24, 1909. Serial No. 497,954.

*To all whom it may concern:*

Be it known that I, HUGH M. MONTGOMERY, a citizen of the United States, residing at Indianola, in the county of Sunflower and State of Mississippi, have invented certain new and useful Improvements in Receptacles for Live Bait, of which the following is a specification.

My invention relates to an improvement in the construction of live-bait boxes, and my object is to provide a simple and inexpensive box which may be permitted to remain in the water while the boat, to which it is tied, is moving.

A further object of my invention is to provide a live-bait box of a novel shape and construction whereby it may remain in the water while the boat is moving and whereby it will tend to move inwardly toward and against the boat, during its movement out of range of, and interference with, the boat operating or propelling parts.

A further object of my invention is to provide a live-bait box embodying a perforate bodily-removable inner bait receptacle, and so constructed that it supports itself within the water in position for ready accessibility to its bait receptacle, which can be removed and the bait selected without wetting the hands.

Further objects and advantages of my invention will be apparent from the following description, in which reference is had to the accompanying drawing, which illustrates my invention and forms a part of this specification.

In the drawing:—Figure 1 is a perspective view of a bait box constructed in accordance with my invention. Fig. 2 is a vertical cross section therethrough. Fig. 3 is a horizontal sectional view therethrough, and Fig. 4 is a perspective view of the inner bait receptacle, removed.

In the construction of my improved bait box I provide an outer casing 5, formed of a suitable sheet metal and embodying opposing side walls 6 and 7, the side edges of which are suitably united, the wall 7 being curved as shown to present an outwardly convex form.

Between the walls 6 and 7, adjacent the sides thereof, are inserted strips or walls 8 and 9 forming side air chambers 10 and 11, and forming between them a chamber 12 for the reception of a removable inner bait receptacle 13.

The lower edges of the side walls 6 and 7 are connected by an imperforate bottom 14, and are provided with central perforate sections 15 whereby the casing may float in the water by virtue of its air chambers 10 and 11, though partially submerged by virtue of the water it takes into its central chamber 12 through the said perforate sections 15. The upper edges of side walls 6 and 7 are connected, by plates 16 over the upper ends of air chambers 10 and 11, and forming tops closing the same, and also by a lid 17 over the central chamber 12, hinged to the upper edge of wall 6. The casing may also be provided with a bail 18 having its ends journaled in clips 19 secured upon the air chamber top plates 16.

The inner bait receptacle 13 is formed in substantially the same shape as casing 5, and of perforate material, and has a handle 20 centrally upstanding from its base, through its upper open end, whereby it may be readily lifted out of the said casing.

In use, the casing 5 is placed in the water at one side of the boat, and attached thereto by a suitable attaching cord through rings 21 or 22 secured through openings in the meeting edges of walls 6 and 7 at opposite sides of the casing. Thus the casing may be attached to either side of the boat with its flat wall 6 toward the boat whereby the impact of the water against its outwardly convex wall tends to move the casing inwardly toward the boat when the same is moving and prevent it from interfering with the oars.

Having thus described the invention what I believe to be new and desire to secure by Letters Patent, is:—

1. A bait box comprising a floatable casing having a flat side and an outwardly convex wall, vertical partition strips secured in said casing and adapted to form separate chambers therein, and perforate sections secured in opposite sides of one of said chambers, substantially as described.

2. A bait box comprising a floatable casing having a flat side and an outwardly convex wall, vertical partition strips secured in said casing and adapted to form air-tight chambers at opposite ends thereof and a central open chamber, a hinged cover for the central chamber, central perforate sections in the side walls of the casing, and a removable bait receptacle of perforate material adapted to fit within the central chamber.

3. In a bait box, a floatable casing embodying side walls closed at the bottom and having perforate sections, one of said walls being curved to present an outwardly convex form and having its edges united with the edges of the opposing wall, partition strips extending between the said walls at the sides of the perforate sections and forming air chambers, and a removable perforate bait receptacle within said casing between said partition strips.

4. In a bait box, a floatable casing embodying side walls closed at the bottom, one of said walls being curved to present an outwardly convex form, and having its edges united with the edges of the opposing relatively flat wall, partition strips extending between the said walls adjacent their united edges and forming air chambers closed at their upper ends and a central open chamber, said walls having perforate sections communicating therein between said partition strips, a removable perforate bait receptacle within the open chamber between said strips, a hinged lid for said open chamber, and a bail spanning said hinged lid and having its end journaled upon portions of the casing at opposite sides of said lid.

In testimony whereof I affix my signature, in presence of two witnesses.

HUGH M. MONTGOMERY.

Witnesses:
  W. V. HARDY,
  W. R. FRENCH.